United States Patent [19]

Seigneur et al.

[11] Patent Number: 5,143,131
[45] Date of Patent: Sep. 1, 1992

[54] SELECTABLE SPRAY PATTERN CHAIN SAW BAR SYSTEM

[75] Inventors: Christopher D. Seigneur, West Linn; Robin A. Plumbley, Portland, both of Oreg.

[73] Assignee: Blount, Inc., Montgomery, Ala.

[21] Appl. No.: 782,432

[22] Filed: Oct. 25, 1991

[51] Int. Cl.$^5$ .................. B27M 1/00; B27B 1/00; A01G 23/08
[52] U.S. Cl. .................. 144/364; 30/123.4; 30/387; 83/169; 144/3 D; 144/2 Z; 144/34 R; 144/357; 144/338; 144/3 N; 401/137
[58] Field of Search .............. 47/1.5; 401/137, 138, 401/198; 83/169, 170, 171; 30/123.4, 381, 382, 383, 384, 385, 386, 387; 144/3 N, 3 D, 2 Z, 34 R, 364, 380, 337, 338

[56] References Cited

U.S. PATENT DOCUMENTS

| 2,748,810 | 6/1956 | Strunk ........................ 30/123.4 |
| 2,913,020 | 11/1959 | Nielsen . |
| 3,044,506 | 7/1962 | Oehrli . |
| 3,185,191 | 5/1965 | Olsen . |
| 3,279,508 | 10/1966 | Ehlen et al. . |
| 3,578,779 | 5/1971 | Ishizaki . |
| 3,621,896 | 11/1971 | Hamilton . |
| 4,027,986 | 6/1977 | Patrick ........................ 47/1.5 |
| 4,169,173 | 9/1979 | Bergholm et al. ......... 144/3 N |
| 4,819,332 | 4/1989 | Sugihara et al. . |
| 4,947,550 | 8/1990 | Wenzel ........................ 30/123.4 |
| 4,965,934 | 10/1990 | Eriksson et al. ............ 30/387 |
| 4,981,129 | 1/1991 | Österman et al. . |
| 5,014,435 | 5/1991 | Date et al. .................. 30/387 |
| 5,050,303 | 9/1991 | Sinclair et al. ............. 30/387 |

FOREIGN PATENT DOCUMENTS 908296 4/1954 Fed. Rep. of Germany .
2321316 11/1974 Fed. Rep. of Germany .

Primary Examiner—W. Donald Bray
Attorney, Agent, or Firm—Klarquist, Sparkman, Campbell, Leigh & Whinston

[57] ABSTRACT

A fluid spraying saw bar, and a chain sawing apparatus, such as a tree harvester, having such a saw bar are provided for selectively applying a predetermined fluid pattern of urea on a tree stump during felling, and of paint on a log end during bucking. A bar member supports an endless saw chain and has an elongate chamber therein to receive pressurized fluid from a harvester reservoir. Plural fluid emitting holes extend from the chamber to at least one side surface of the bar member. A tubular or a dual valve plate flow controller is slidably received in the chamber operatively engaged by a harvester actuator to control flow through the fluid emitting holes. For a rot-preventing urea spray, the pattern is adjusted for logs of varying diameter. For a marking spray, a striping spray pattern is selected in response to a harvester computer generated signal to indicate log length, diameter, mill designators, and the like. A method is also provided of selectively and controllably providing a predetermined spray pattern of fluid on a surface formed by the cutting action of the chain saw during cutting.

51 Claims, 8 Drawing Sheets

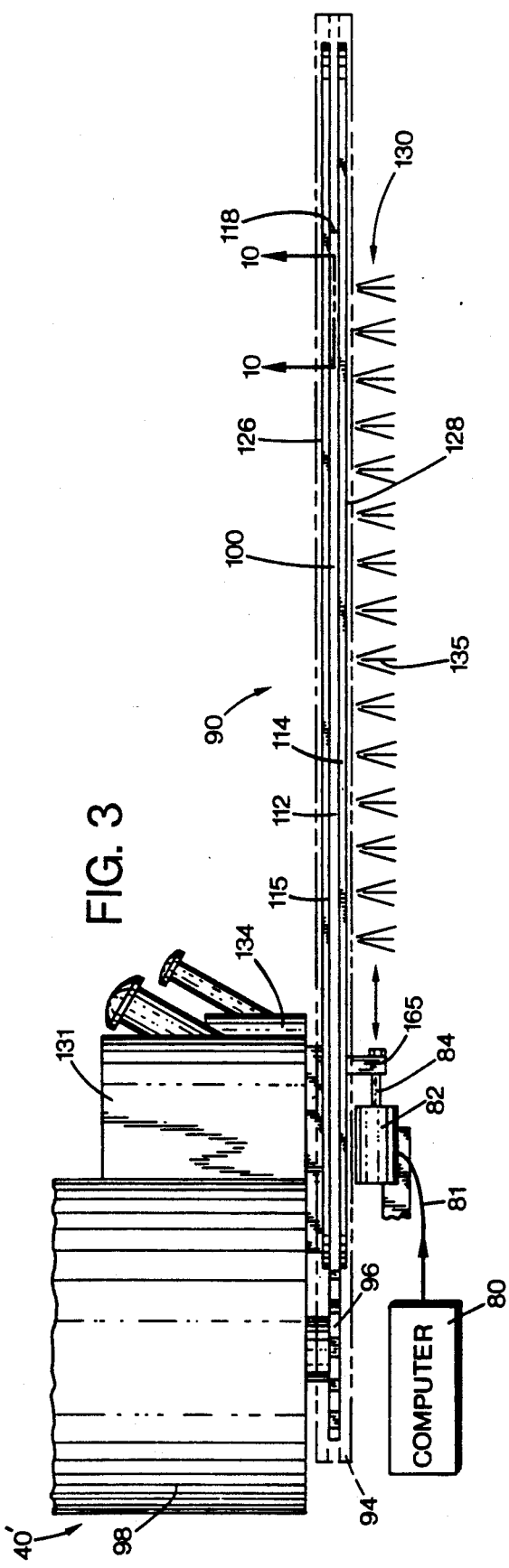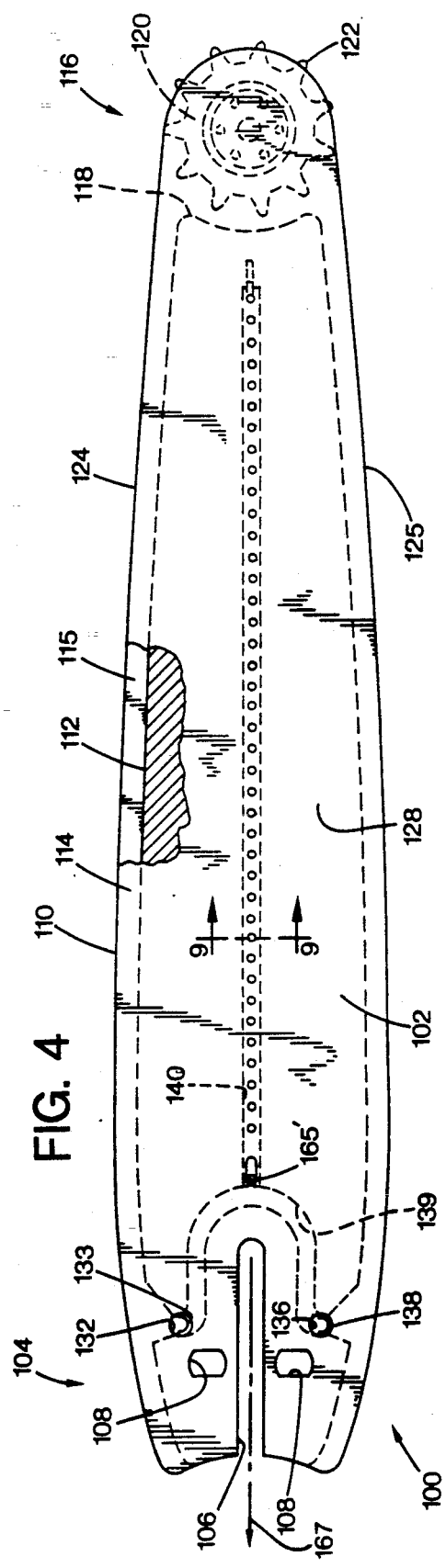

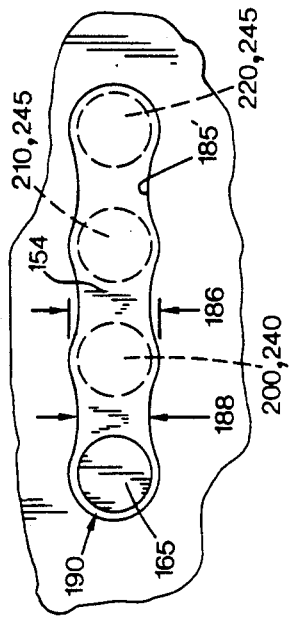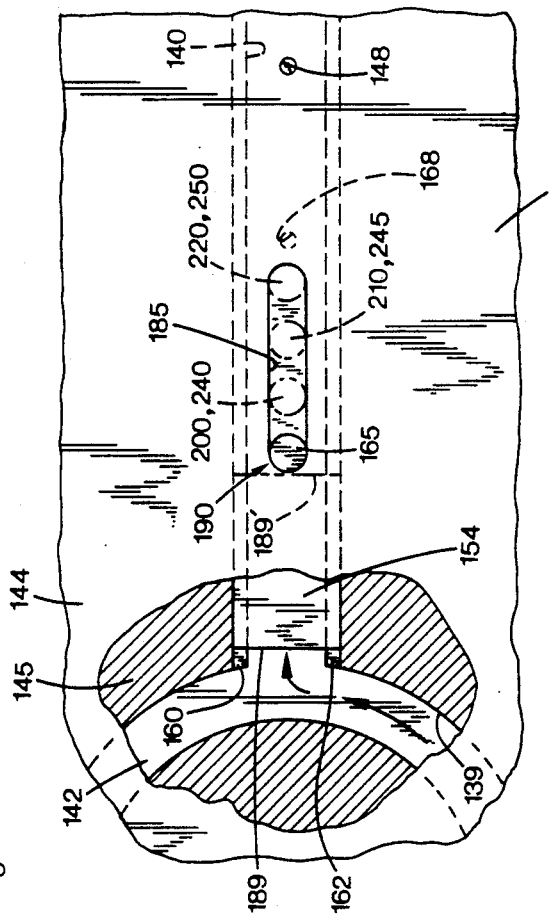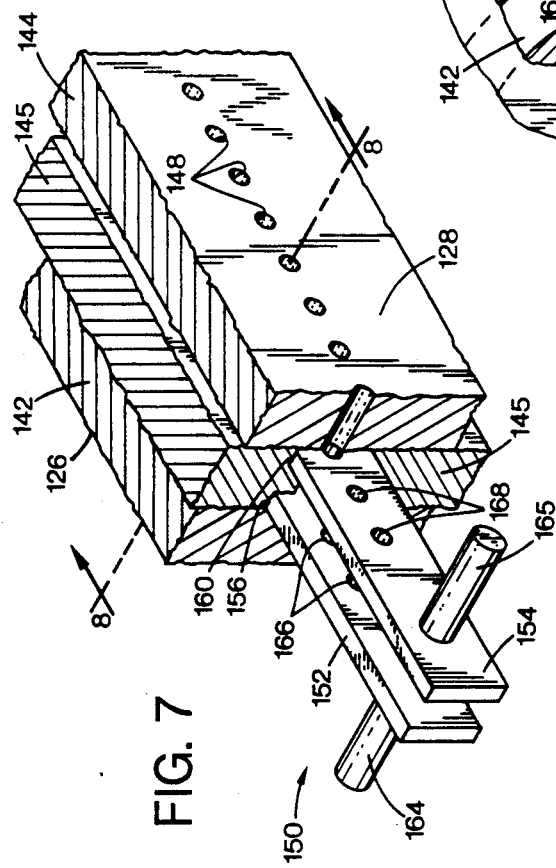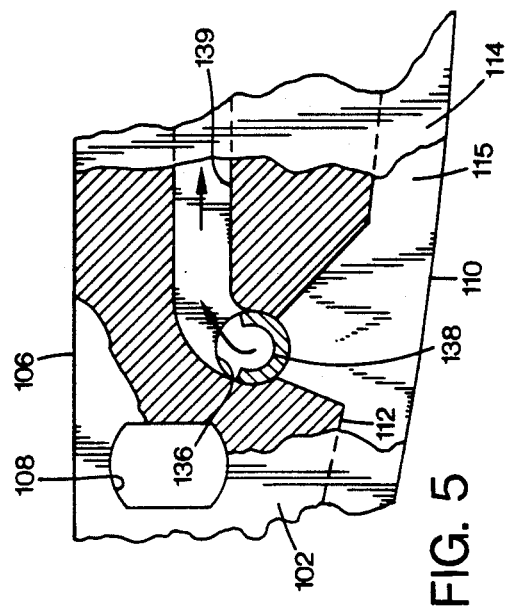

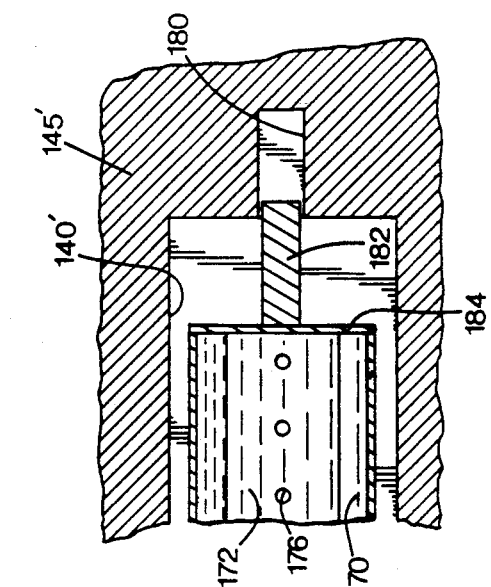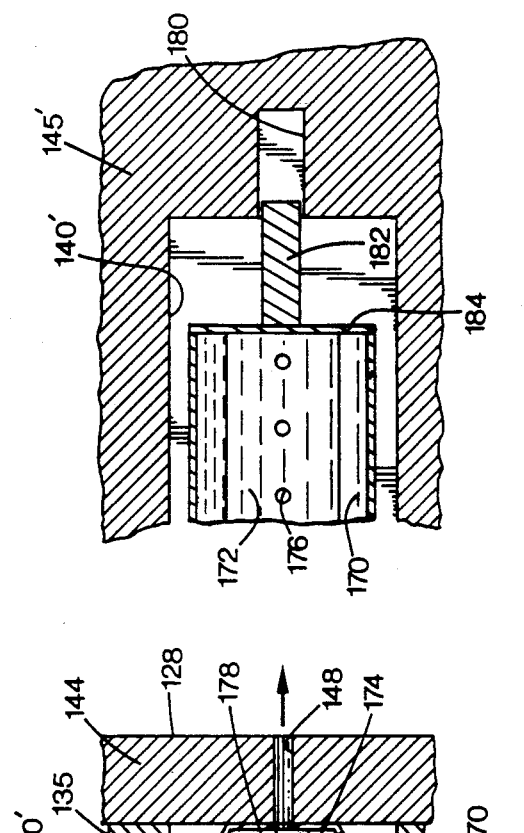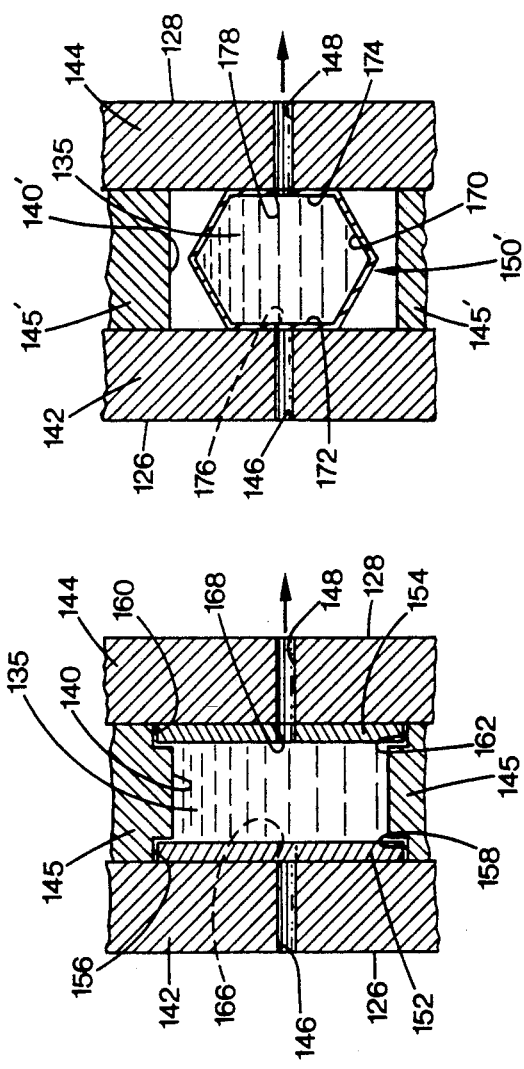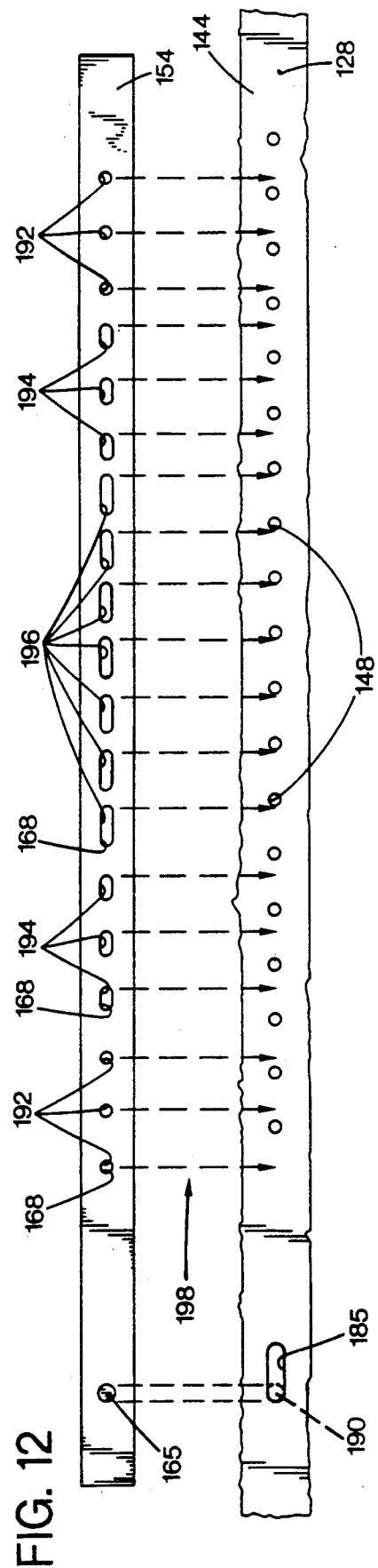

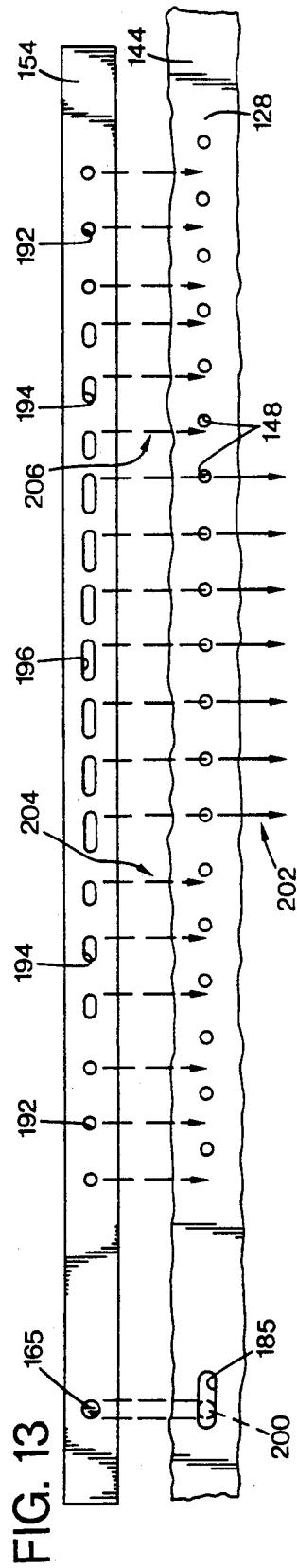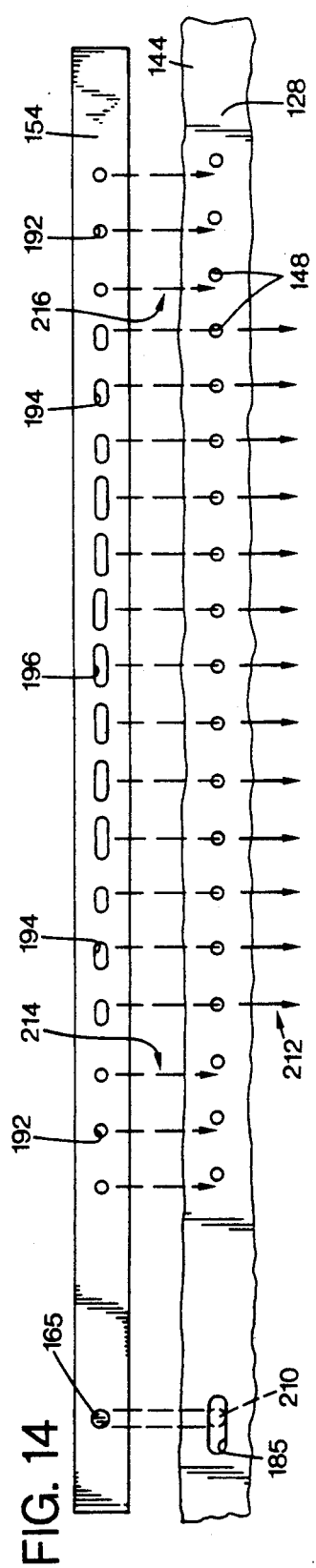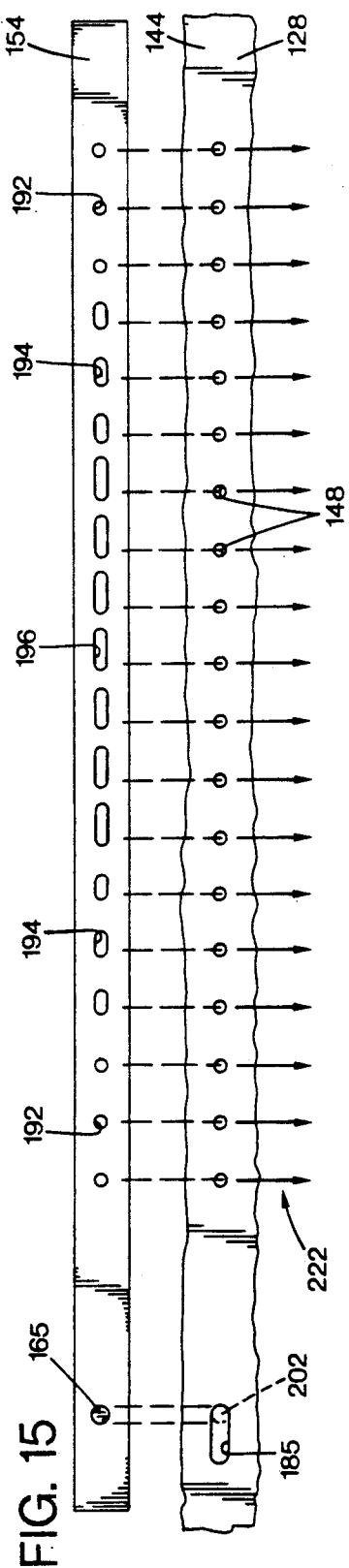

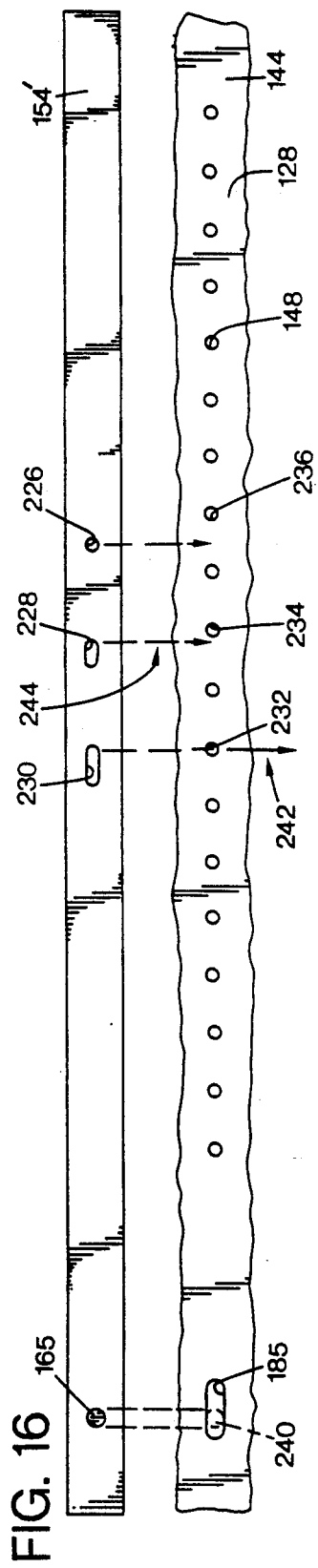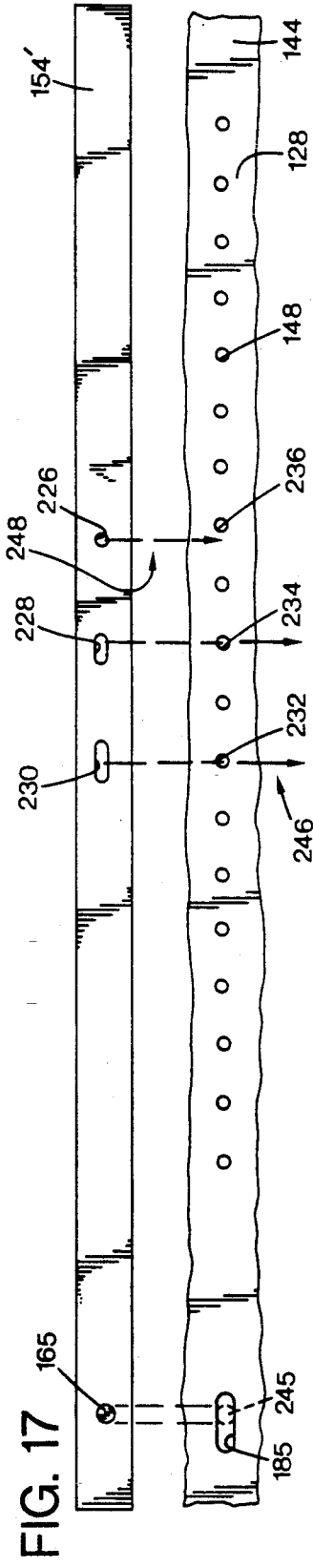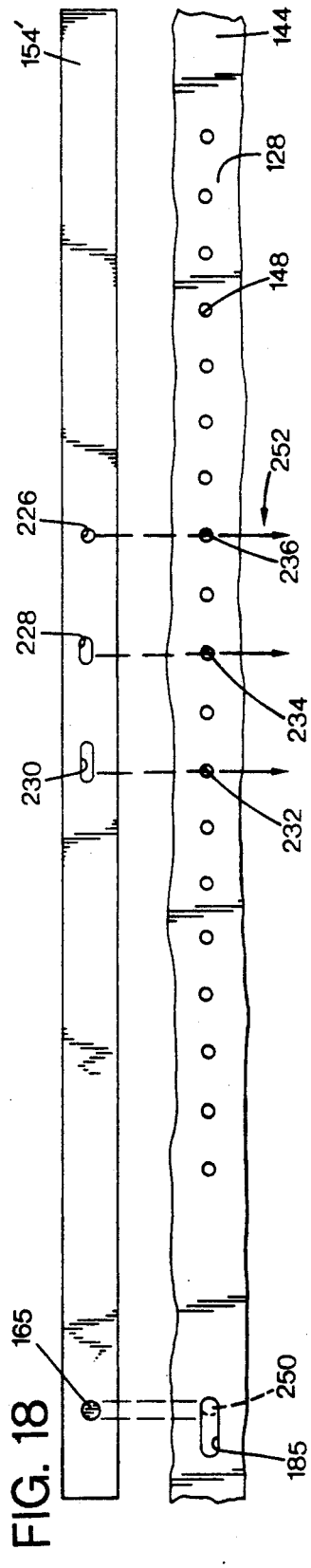

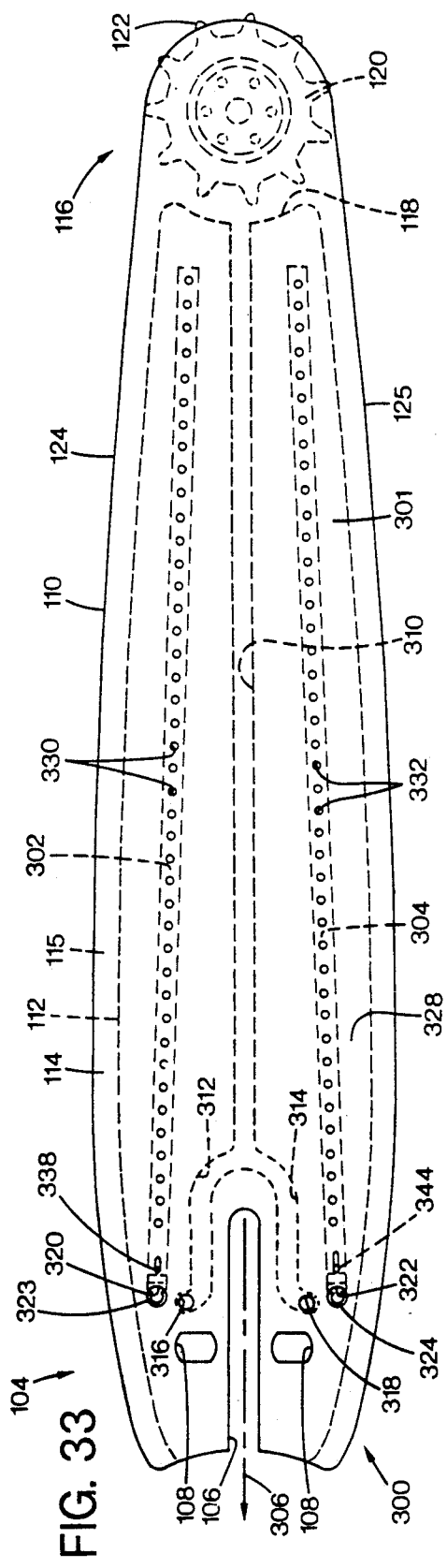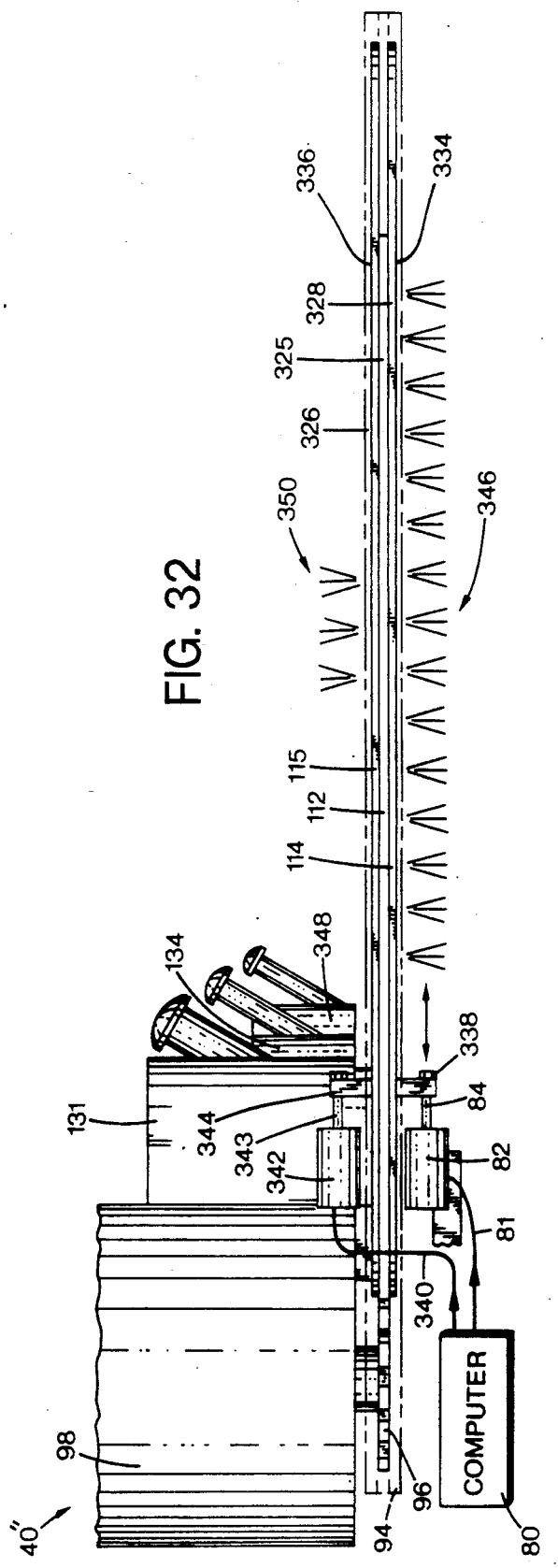

SELECTABLE SPRAY PATTERN CHAIN SAW BAR SYSTEM

BACKGROUND OF THE INVENTION

The present invention relates generally to a chain saw bar system, such as may be used on tree harvesters, and more particularly to an improved selectable spray pattern chain saw bar system, including an improved saw bar for applying a predetermined fluid pattern, an improved harvester, and an improved method of applying a predetermined pattern of fluid on surface formed by cutting during the cutting step. The improved saw bar, harvester and method of the present invention may be used to spray a rot preventing agent, such as urea, on tree stumps when felling trees, or to selectably spray a predetermined paint pattern on an end of a log formed by cutting during log bucking, with the paint pattern selected designating various log characteristics or other identifiers.

Other saw bar systems have been proposed for spraying urea on a tree stump during the tree felling process. For instance, U.S. Pat. No. 5,050,303 to Sinclair et al. discloses a chain saw bar fluid passage system having a saw bar which sprays urea therefrom onto the stump of a felled tree. However, Sinclair et al. is limited to dispensing fluid from a single side of the saw bar. Furthermore, the Sinclair et al. saw bar has no manner of controlling the flow of urea spray therethrough, leading to large amounts of urea being wasted when cutting small diameter trees.

Other systems have been used for color marking the ends of logs to designate various characteristics of the log, such as for scaling of length, diameter or for other identification purposes. For example, U.S. Pat. No. 4,169,173 to Bergholm et al. discloses a method of color marking the ends of logs which have previously been cut to predetermined lengths. Bergholm et al. requires the logs to first be severed from their stumps and then transported to the cutting and marking processor. Bergholm et al. is limited to color coding the logs in a separate step after the log has been completely severed.

Tree harvesting machines or harvesters typically have large tractor-mounted feller heads or harvester heads for cutting timber. Some harvesters use large chain saw bars with an endless cutting chain which is swept horizontally through a tree to sever it from the remaining stump. One such tree harvester is disclosed in U.S. patent application Ser. No. 07/691,749, filed on Apr. 25, 1991, and invented by Mack, which is herein incorporated by reference for the teachings and disclosure provided therein. The Mack invention and the invention claimed herein are each owned by a common assignee, Blount, Inc.

The Mack harvester has an onboard computer which receives diameter and length signals from respective diameter and length transducers on the harvester head. The Mack computer uses the length and diameter signals, along with other operator-input signals, to grade logs cut by the Mack harvester. The Mack computer also provides a grade indication signal to a color selector circuit which controls the flow of varying colors of paint to a spray nozzle. The nozzle is solenoid actuated to spray paint only after the log has been cut and the chain saw returns to a rest position so the saw bar will not be sprayed by the paint.

Thus, a need exists for an improved selectable spray pattern chain saw bar system, including an improved saw bar for applying a predetermined fluid pattern, an improved harvester, and an improved method of applying a predetermined pattern on surface formed by cutting during the cutting step, which are directed toward overcoming, and not susceptible to, the above limitations and disadvantages.

SUMMARY OF THE INVENTION

A fluid spraying saw bar, and a chain sawing device, such as a tree harvester, having such a saw bar are provided for selectively applying a predetermined desired fluid pattern of a rot preventing agent, herein referred to generically as "urea," on a tree stump during felling, and of paint on a log end during bucking. The saw bar has a bar member for supporting an endless saw chain. An elongate chamber within the bar member receives fluid from a reservoir on the harvester. The bar member has plural fluid emitting holes extending from the chamber to at least one side surface of the bar member. A flow controller is slidably received in the chamber to respond to a harvester actuator for controlling fluid flow through the fluid emitting holes to provide the desired spray pattern. For a rot-preventing urea spray, the pattern may be adjusted for logs of varying diameter. For a marking spray, a striped spray pattern may be adjusted in response to a signal generated by a computer on board the tree harvester, to indicate log length and diameter, and to apply mill designators, and other identifiers. A method is also provided of selectively and controllably applying a predetermined spray pattern of fluid on a surface formed by the cutting action of the chain saw during cutting.

An overall object of the present invention is to provide an improved fluid spraying saw bar for selectively and controllably applying a predetermined pattern of fluid from the saw bar.

Another overall object of the present invention is to provide an improved harvester that selectively applies a predetermined desired pattern of fluid from a saw bar while cutting with the saw bar.

A further overall object of the present invention is to provide an improved method of applying a fluid from a saw bar while cutting to apply a fluid pattern onto a surface formed by the cutting action of the saw bar and saw chain.

An additional object of the present invention is to provide a fluid spraying saw bar which is controllably and selectively capable of spraying fluid from two different reservoirs to the same side or to opposing sides of the saw bar.

Another object of the present invention is to provide a fluid spraying saw bar which is reversible so that either of two opposing cutting edges may serve as a leading cutting edge.

Still a further object of the present invention is to provide an improved fluid spraying saw bar which conserves fluid.

Yet another object of the present invention is to provide an improved fluid spraying saw bar which provides a variety of paint markings to a surface formed by the cutting action of the saw bar and saw chain.

The present invention relates to the above features and objects individually as well as collectively. These and other objects, features and advantages of the present invention will become apparent to those skilled in the art from the following description and drawings.

BRIEF DESCRIPTION OF THE DRAWINGS

FIG. 3 is a side elevational view of a portion of one form of an alternate harvester of the present invention;

FIG. 4 is a bottom plan view of the fluid spraying saw bar of FIG. 3 which may also correspond to the top plan view thereof;

FIG. 5 is an enlarged cutaway view of a fluid inlet portion of the saw bar of FIG. 4;

FIG. 6 is an enlarged cutaway view of a fluid chamber portion of the saw bar of the present invention;

FIG. 7 is an enlarged cutaway view of one form of a flow controller portion of the present invention;

FIG. 8 is a sectional view taken along lines 8—8 of FIG. 7;

FIG. 9 is an enlarged sectional view of an alternate flow controller portion of FIG. 4 taken along lines 9—9 thereof, FIG. 10 is an enlarged sectional view taken along lines 10—10 of FIG. 3;

FIG. 11 is an enlarged view of a positioner slot portion of the saw bar of FIG. 4;

FIG. 12 is a schematic flow diagram of a flow controller of the present invention shown in an "off" condition, preventing fluid flow through the spraying saw bar;

FIGS. 13-15 are schematic flow diagrams of a flow controller of the present invention shown spraying varying sized patterns of fluid from the saw bar, with FIG. 13 showing a small sized pattern, FIG. 14 showing an intermediate sized pattern, and FIG. 15 showing a large sized pattern;

FIGS. 16-18 are schematic flow diagrams of an alternate flow controller of the present invention shown spraying varying types of marking or striping patterns of fluid from the saw bar, with FIG. 16 showing single line pattern; FIG. 17 showing a double line pattern, and FIG. 18 showing a triple line pattern;

FIGS. 20-32 illustrate several spray patterns of fluid lines applied to the butt end of a felled and bucked log using the flow controller of FIGS. 16-18, with: FIG. 20 showing a single stripe continuous line pattern, FIG. 21 showing a double stripe continuous line pattern, FIG. 22 showing a triple stripe continuous line pattern, FIG. 23 showing a single line broken stripe pattern, FIG. 24 showing a double line broken stripe pattern, FIG. 25 showing a triple line broken stripe pattern, FIG. 26 showing a single line center stripe pattern, FIG. 27 showing a double line center stripe pattern, FIG. 28 showing a triple line center stripe pattern, FIG. 29 showing an alternating single and double line stripe pattern, FIG. 30 an alternating triple and double line stripe pattern, and FIG. 31 showing an alternating triple and single line stripe pattern;

FIG. 32 is a side elevational view of a portion of one form of another alternate harvester of the present invention shown having two actuators; and FIG. 33 is a bottom plan view of the fluid spraying saw bar of FIG. 32 which may also correspond to the top plan view thereof.

DETAILED DESCRIPTION OF THE PREFERRED EMBODIMENTS

Figure 2:
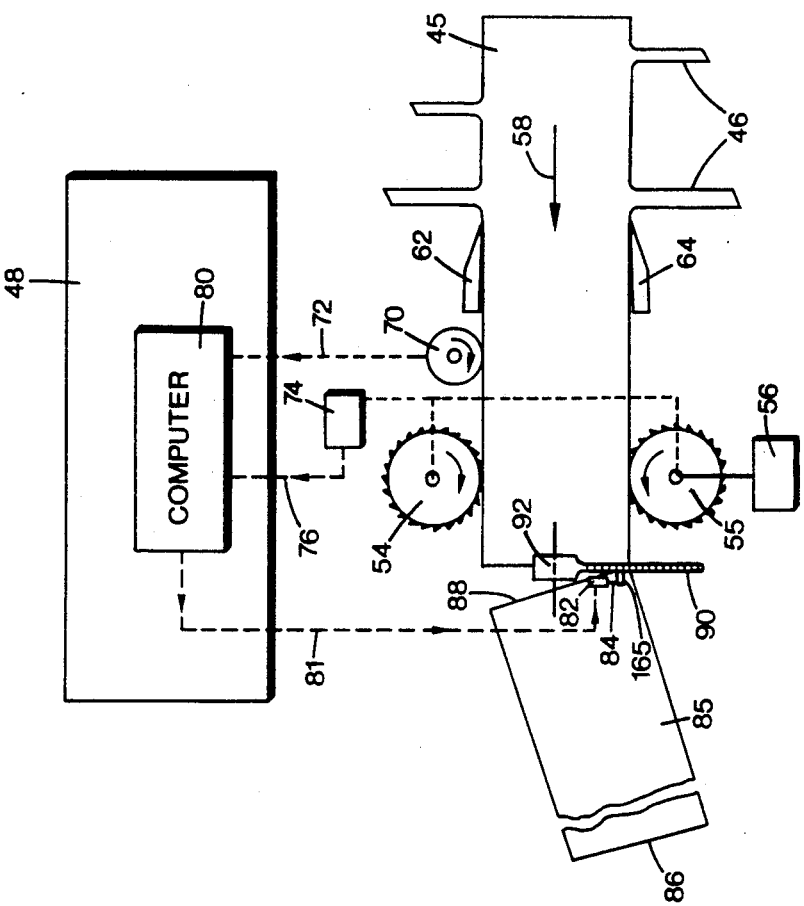
FIG. 2 is a schematic block diagram of one form of a harvester of the present invention shown bucking a fallen tree.
Figure 1:
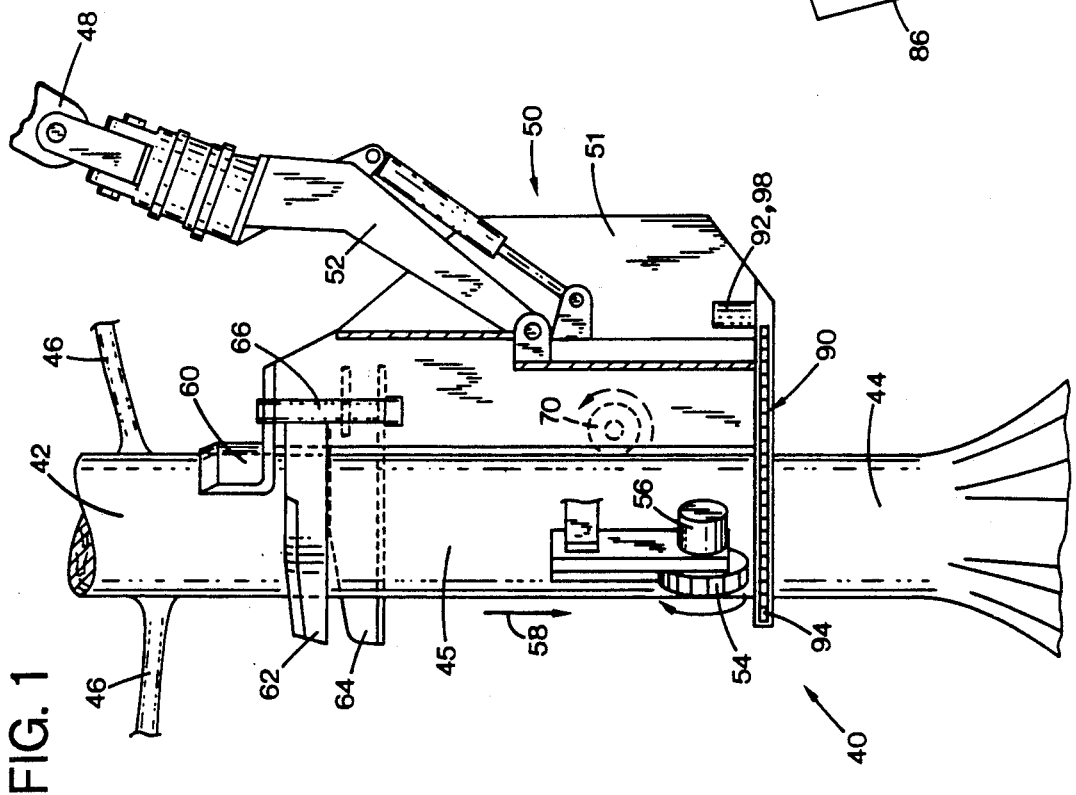
FIG. 1 is a side elevational view partly in section of one form of a harvester head of the present invention shown, felling a tree.

FIGS. 1 and 2 illustrate one form of a chain sawing apparatus, such as a tree harvester 40 constructed in accordance with the present invention for harvesting a tree 42. The tree 42 includes a stump portion 44, a severed or felled portion 45, and plural branches or limbs 46 extending outwardly from the tree trunk. The tree harvester 40 includes a conventional tractor 48, a portion of which is shown in FIG. 1. A feller head or harvester head 50 has a harvester frame 51 coupled by a yoke assembly 52 to a hydraulic boom of tractor 48.

A pair of opposing drive wheels 54 and 55 are pivotally mounted to the harvester head 50 and have chain-covered or spiked outer surfaces to engage opposite sides of the felled tree 45. The drive wheels 54 and 55 are driven by a hydrostatic motor 56 (for simplicity, shown only coupled to drive wheel 55 in FIG. 2). The wheels 54 and 55 are rotated to convey the felled tree 45 through the harvester head 50 in a direction indicated by arrow 58. The harvester head 50 has plural delimbing knives or delimbers 60, 62 and 64 for removing limbs 46 from the felled tree 45. The delimbers 62 and 64 are pivoted to the harvester head 50 by pivots 66 for adjustably accommodating different log diameters.

The harvesting head 50 may have means for determining the length, diameter and other factors concerning the felled tree 45. For example, the harvesting head 50 has a log length determining device comprising at least one idler roller 70 contacting the side of the felled tree 45. The idler roller 70 produces a length signal 72 as the drive wheels 54, 55 convey the felled tree 45 past roller 70. A conventional shaft encoder (not shown) may be coupled to the idler roller 70 to produce a digital output log length signal 72 corresponding to the rotational position of the idler roller shaft. A log diameter determining device 74 is coupled to the drive wheels 54 and 55 to indicate the spacing between the drive wheels which corresponds to the diameter of the felled tree 45. The log diameter determining device 74 produces a log diameter signal 76.

A controller, such as a microprocessor or computer 80 is mounted on board tractor 48, as indicated schematically in FIG. 2. The computer 80 receives the log length signal 72 from the idler roller 70, and the log diameter signal 76 from the diameter determining device 74. The computer 80 processes the log length and diameter input signals 72, 76 to determine the volume of wood in the log. The computer 80 may also include a memory unit (not shown) which stores the log volume signal. The log volume signal may be supplied as a computer output to a suitable analog display device or recorder (not shown). The computer 80 may be programmed to provide a flow control signal 81 to an actuator 82 for use as described further below. The actuator 82 may be a servo or incremental linear actuator, such as a ball screw actuator with a pulse servomotor. Such a servomotor is responsive to a series of pulses from signal 81 to provide selectively incremental linear motion to an actuating arm 84.

The harvester 40 produces a log 85 having opposing butt ends 86 and 88 by severing the log 85 from the remainder of the felled tree 45 with a chain saw 90. The log is cut by a pivotal sweep of the chain saw 90 about a pivot 92 coupling the chain saw 90 to the harvester head frame 51. The chain saw 90 has an endless cutting chain 94 driven in a conventional manner by the harvester head 50.

In a typical cycle, a tree 42 is felled by first grasping by the harvester head 50 and severed by a horizontal sweep of the chain saw 90. During this horizontal cut, urea is dispensed downwardly onto the freshly cut surface of stump 44 in a manner described further below in accordance with the present invention. The term "urea" is used generically herein and includes all equivalent rot-preventing agents known by those skilled in the art. The felled tree 45 is then laid substantially horizontally by the harvester head 50 and elevated three to five feet above the ground. In this elevated position, the drive wheels 54 and 55 draw the felled tree 45 in the direction indicated by arrow 58 through the delimber knives 62, 64 for delimbing. The felled tree is bucked into desired lengths, such as sixteen or forty foot lengths, by a vertical pivoting sweep of the chain saw 90 to form the log 85, with the chain saw 90 shown at the completion of a downward swing in FIG. 2.

Referring now to FIG. 3, an alternate embodiment of a chain sawing apparatus 40' shows the saw chain 94 driven by a chain sprocket 96. The sprocket 96 is coupled to conventional drive means, such as a drive engine or hydraulic motor 98, which may receive power from the tractor 48. The chain saw 90 has a first embodiment of a fluid spraying saw bar 100. While several preferred embodiments of a laminated saw bar are discussed below, it is apparent that the fluid spraying saw bar as described herein may also be constructed from a solid saw bar, in the nature of that taught by Sinclair et al. in U.S. Pat. No. 5,050,303. Furthermore, it is also apparent that the saw bar as described herein may also be used with a chain sawing apparatus comprising a conventional hand-held chain saw (not shown).

Referring to FIG. 4, the saw bar 100 has a bar member 102 with an attachment end 104 having a mounting slot 106 and one or more mounting holes 108. The slot 106 and mounting holes 108 may used for bolting, pinning or otherwise securely attaching the saw bar 100 to the harvester frame 51 in a conventional manner. The bar member 102 has a peripheral edge 110 with conventional guide means for supporting the saw chain 94 about at least a portion of the peripheral edge 110. The guide means may include a guide groove 112 flanked by two guide rails 114 and 115.

The bar member 102 has a nose end 116 which may include a sprocket-receiving recess 118 for pivotally receiving and supporting an idler sprocket or nose wheel 120 (shown in FIG. 4, and omitted for clarity from FIG. 3). The nose wheel 120 has a plurality of outwardly projecting teeth 122 which engage drive links (not shown) in a conventional saw chain 94 to carry the chain about the saw bar nose end 116.

The bar member peripheral edge 110 also includes first and second cutting edges 124, 125. The bar m ®mber 102 also has two opposing outer surfaces 126 and 128. The saw bar 100 as described herein may be of a reversible construction so the saw bar may be flipped, that is, either outer surface 126 or 128 may serve as a spraying surface for providing a predetermined or desired fluid spray pattern 130 from the saw bar as described below. Furthermore, this reversible feature allows either cutting edge 124 or 125 to serve as a leading cutting edg ®which first encounters and cuts tree 42, with the opposite edge being referred to as a trailing edge. Advantageously, this reversibility feature may double the saw bar life.

The saw bar 100 has means for receiving a lubrication fluid, such as oil, from a lubrication fluid or oil reservoir 131 (illustrated schematically in FIG. 3) which may be mounted on either the harvester head 50 or tractor 48, or in an equivalent manner known by those skilled in the art. When the saw bar 100 is attached to the harvester head 40', the oil reservoir 131 has a reservoir outlet in communication with a bar member inlet means, such as a lubrication fluid inlet port or oil inlet 132. The oil inlet port 132 has a semi-circular tubular inlet sleeve 133 press fit therein to guide the oil into the saw chain guide groove 112. The saw chain 94 carries the oil from the inlet 132 about the guide rails 114, 115 and within the guide groove 112. The inlet sleeve 133 may be rotated within the oil inlet port 132 to provide the reversibility feature of the saw bar 100 as described further below.

Either the harvester head 40' or the tractor 48 may carry a fluid reservoir, illustrated schematically in FIG. 3 as reservoir 134, for storing a fluid 135 therein. The fluid 135 may be of any type of a desirable fluid, with urea being a preferred fluid for spraying on tree stumps 44 to minimize or prevent stump rot. The fluid 135 may also be a paint or other type of marking liquid for marking a surface being formed by the cutting action of the chain saw, such as the log end 88 of FIG. 2. The paint marking may indicate the log length monitored by idler roller 70, the log diameter measured by the diameter determining device 74, the log quality, the log variety (tree type which would be separate input entered into the computer 80 by an operator), or various mill designators or other identifying information. The various markings are applied to the log end 88 in response to the flow control signal 81 provided by computer 80. Such paint marking for log scaling purposes is particularly advantageous for promoting faster log sorting. The various methods of applying this fluid by spraying are described further below with reference to the structure of the saw bar for accomplishing the spraying.

Referring also to FIGS. 5 and 6, the fluid 135, which is preferably pressurized by pressurizing means, such as a pumping unit (not shown), enters saw bar 100 through a bar member inlet means, such as a fluid inlet port 136. The inlet port 136 is partially lined with a semi-circular tubular fluid inlet sleeve 138 Which directs the flow of fluid into a delivery passageway 139. The sleeve 138 may be a press fit insert as described above for sleeve 133. The fluid 135 flows from the inlet port 136 through the fluid delivery passageway 139 and into a channel, or passageway configured as an elongate chamber 140.

The delivery chamber 139 may be horseshoe-shaped as shown in FIG. 4 to create a passageway coupling together chamber 140 with inlet ports 132 or 136, depending upon the orientation of the rotatable sleeves 133 and 138 within their respective ports 132, 136. Thus, if the first cutting edge 124 is used as the leading cutting edge and it becomes worn, the saw bar 100 may be removed from the harvester head 50 and flipped over to allow the second cutting edge 125 to become the leading cutting edge. Since the oil outlet and fluid outlet of the harvester are usually permanently mounted to the harvester head 50, as the bar is flipped over, the inlet sleeves 133 and 138 must be rotated through approximately 180°. Upon reassembly of the flipped saw bar, the oil then received through port 136 is directed outwardly to guide groove 112, and the fluid received through port 132 is directed inwardly toward the delivery channel 139. This feature also contributes to the reversible nature of saw bar 100 to provide for additional bar life.

Referring also to FIGS. 7 and 8, one form of the bar member 102 is illustrated as comprising a laminated bar having a pair of outer laminate plates 142 and 144, with an inner laminate plate 145 sandwiched therebetween. The laminate plates 142, 144 and 145 may be joined together in any conventional manner known by those skilled in the art. In the illustrated embodiment, the outer plate 142 has a first set of plural outlet ports, apertures, orifices, or fluid emitting holes, such as holes 146, extending from the chamber 140 outwardly to the outer surface 126. Similarly, in the illustrated embodiment, the outer plate 144 has a second set of plural outlet ports, apertures, orifices, or fluid emitting holes, such as holes 148, extending from the chamber 140 outwardly to the outer surface 128.

It is apparent that in some embodiments, the fluid emitting holes 146 or 148 may be omitted from one of the outer plates 142, 144 to provide a bar capable of spraying fluid 135 in only one direction. Furthermore, although the figures show the fluid emitting holes to be evenly spaced along the length of the bar member 102, other spacings may be more appropriate in some applications. Although the fluid emitting holes 146 and 148 are illustrated as being circular in nature, they may also be any other convenient shape, such as an elongated slot, rectangular, or other polygonal shapes which may prove appropriate for some applications.

FIGS. 6-8 best illustrate a first embodiment of a flow controller 150 which is slidably received within chamber 140. The flow controller 150 has a pair of slide bars, orifice plates or valve plates 152, 154 serving as flow control walls. One manner of locating the valve plates 152 and 154 within chamber 140 is best illustrated in FIG. 8 where the inner laminate plate 145 has four recessed grooves 156, 158, 160 and 162 formed therein. Valve plate 152 is slidably received within grooves 156 and 158, while valve plate 154 is slidably received within grooves 160 and 162. The grooves 156-162 retain the valve plates 152 and 154 in positive engagement with the inner surfaces of the respective outer plates 142 and 144.

Each of the valve plates 152 and 154 has an actuating member, positioner or actuator pin 164 and 165, respectively. The actuator pins 164 and 165 are shifted linearly to move the slider bars 152 and 154 in a longitudinal direction within chamber 140 substantially parallel with a longitudinal axis 167 of the saw bar 100 (see FIG. 4). To selectively allow the fluid 135 to pass from within chamber 140 through the fluid emitting holes 146 and 148, each of the valve plates 152 and 154 has a plurality of flow control ports, orifices or holes 166 and 168, respectively, extending therethrough. As shown in FIG. 8, when the control holes, such as holes 166 of valve plate 152 is not aligned with the corresponding or associated fluid emitting holes 146, the fluid 135 is prohibited or prevented from exiting chamber 140 toward the outer surface 126. However, when the flow control and fluid emitting holes are at least partially aligned as shown for holes 168 and 148, the fluid 135 is sprayed outwardly from chamber 140 and away from the outer surface, such as surface 128. Several embodiments for providing a variety of predetermined spray patterns 130 are discussed further below.

Referring to FIGS. 4, 9 and 10, an alternate elongate chamber 140' is shown as having an alternate flow controller 150' comprising a tubular fluid chamber liner member 170 slidably received and captured therein. The tubular liner member 170 has opposing flow control walls 172 and 174 which each have respective first and second sets of control holes 176 and 178 therethrough. The liner member 170 has a pair of actuator pins, such as 165' shown in FIG. 4, extending outwardly from each of the flow control walls 172 and 174, in a similar manner to that shown for flow controller 150 in FIG. 7.

As shown in FIGS. 9 and 10, the chamber 140' is formed by a recess in an inner plate 145' and differs from the FIG. 8 chamber 140 which has grooves 156-162. Also, to maintain alignment of the control holes 176 and 178 with the respective associated fluid emitting holes 146 and 148, the chamber 140' has an alignment or expansion recess 180 formed within the inner plate 145'. The recess 180 slidably receives an alignment pin 182 extending outwardly from an end wall 184 of the liner member 170.

In the illustrated embodiment, the tubular liner 170 has a hexagonally shaped cross section. The positive spacing between the control walls 172 and 174 is maintained by the V-shaped liner member wall portions extending between the control walls 172 and 174. This positive spacing provides a fluid seal between the liner member 170 and the inner surfaces of plates 142 and 144. It is apparent that other cross sectional shapes may be suitable for the liner member, as long as an adequate fluid seal is maintained to substantially prohibit fluid from leaking through the emitting holes 146 and 148 when no fluid flow therethrough is desired. It is also apparent that the liner member 170 may be formed to slidably contact the inner plate 145'. However, in the illustrated embodiment, the liner member 170 is spaced apart from the inner surfaces of the inner plate 145' to prevent binding and allow for expansion of the liner 170 if the saw bar should accidentally be bent during use. Furthermore, the hexagonal shape of the liner member 170 allows the liner to compress if the saw bar is bent, and then to spring back into a sealing position later during restraightening of the saw bar.

The various positions of flow controllers 150 and 150' are illustrated in FIGS. 6 and 11-31 with respect to the valve plate controller 150. However, it is apparent that the flow control holes 176 and 178 of the tubular liner 170 may be spaced and located as described below for holes 166 and 168 of valve plates 152 and 154. Furthermore, the outer plates 142 and 144 advantageously may be of the same configuration for both flow controller 150 and 150', which saves on manufacturing costs by requiring less parts to be inventoried, stored, etc.

Referring now to FIGS. 6 and 11, the flow controller 150 is selectively shiftable by moving the actuator pins within actuator pin slots formed within each of the outer plates 142 and 144. For example, pin 165 is shifted within an actuator pin slot 185 by actuator 82 as shown in FIGS. 2 and 3. The actuator rod 84 is coupled to pin 165 to selectively shift pin 165 into selected locations within slot 185 for controlling the spray pattern 130. Alternatively, the actuator pin 165 may be manually shifted along slot 185 for some chain sawing apparatus applications, for instance with a hand-held chain saw.

The actuator pin slot 185 may have relatively straight sides as shown in FIG. 6, or preferably is an hour-glass slot 185' having a series of linked hour-glass shaped sides as shown in FIG. 11. Slot 185' has a plurality of alternating wide slot portions 186 and narrower necked-down portions 188, with the necked-down portions 188 restricting the movement of pin 165 to positively position the pin 165 within a wide slot portion 186. The necked-down portions 188 act as detents, and may be on the order of a 0.005 inch interference fit with respect to the diameter of pin 165. Thus, the flow controller valve plate 154 fluid entry end is selectively shiftable between positions 189 and 189' (shown in dashed lines in FIG. 6), by shifting actuator pin 165 to the far left and the far right, respectively, in slot 185 or 185'.

Referring to FIGS. 12-15, illustrate one manner of supplying urea spray in an economical, fluid-conserving manner to small, medium and large diameter tree stumps (see FIG. 1). The interaction of the flow controller 150 with the bar member 102 is shown schematically by controller bar 154 and a portion of the outer plate 144. The valve plate 154 has a plurality of control holes 168 therethrough. For the evenly spaced fluid emitting holes 148 of bar member 102, the flow control holes vary in length, with the smallest length or circular holes being designated 192, the elongate control holes having an intermediate length being designated 194, and the longest control holes being designated 196. The long control holes 196 are flanked on each side by the intermediate control holes 194, which are in turn flanked by the circular holes 192. The various positions of actuator pin 165 in slot 185 shown in FIGS. 12-15 correspond to the four positions shown in FIGS. 6 and 11. These four illustrated positions provide three different spray patterns and a no flow or "off" spray pattern position 190 (see FIG. 12).

FIG. 12 illustrates the no fluid flow or off condition position 190 of pin 165 as being located to the far left in slot 185. The misalignment of the control holes 168 with the emitting holes 148 in the off position 190 prohibits the flow of fluid through emitting holes 148, as indicated by the schematic flow control arrows 198.

FIG. 13 shows the actuator pin 165 shifted into a small diameter tree spraying position 200. A small diameter tree spray pattern 202 is produced with position 200 by the flow of fluid from the chamber 140 through the long fluid control holes 196 and through the fluid emitting holes 148. There is no fluid flow through the shortest and intermediate flow control holes 192 and 194, as indicated by the flow arrows 204 and 206.

FIG. 14 shows the actuator pin 165 adjusted into an intermediate diameter tree spraying position 210 which provides an intermediate diameter tree spray pattern 212. The spray pattern 212 is provided by fluid flowing from chamber 140 through the long and intermediate length control holes 196 and 194. There is no fluid flow through the circular control holes 192 as indicated by flow arrows 214 and 216.

FIG. 15 shows the actuator pin 165 shifted into a large diameter tree spraying position 220 for providing a large diameter tree spray pattern 222. In the large position 220, fluid flows through each of the fluid control holes 192, 194 and 196, and through each of the emitting holes 148, as indicated by the flow arrows 224.

Thus, by adjusting the position of the actuator pin 165 within slot 185, with the given arrangement, spacing and sizing of the control holes 168 and fluid emitting holes 148, a variety of predetermined spray patterns may be selected. It is apparent that other arrangements, such as a staggered arrangement (not shown), and other shapes of the control holes 168 with respect to those of the fluid emitting holes 148 may be practiced to provide for varying spray patterns as required.

For example, FIGS. 16-18 show predetermined spray patterns which are particularly useful when fluid 135 is a marking or indicating fluid, such as a paint. An alternate valve plate 154' is shown as having only three holes extending therethrough, specifically, a short length or a circular control hole 226, an elongated intermediate length control hole 228, and an elongated long control hole 230. The outer plate 144 may have fluid emitting holes 148 therethrough with an arrangement identical to that of FIGS. 13-15 as shown. Use of identical outer plates 142 and 144 for urea-spraying and for marking provides various manufacturing and inventory saving costs. The outer plates may be identical whether the valve plate flow control system 150 is used, or whether the tubular liner flow control system 150' is used. Furthermore, while FIGS. 13-18 have shown valve plate 154 and outer plate 144, it is apparent that valve plate 152 and outer plate 142 may be similarly constructed to provide a symmetrical and reversible saw bar 100.

Alternatively, for accomplishing the paint marking method, the outer plates 142 and 144 may have only three holes, 232, 234 and 236 therethrough. For paint marking, the actuator pin 165 may be positioned in a no flow or "off" position adjacent the far left end of slot 185 (not shown) to prohibit flow through the outer plate 144, as shown in FIG. 12 for the urea embodiment.

FIG. 16 shows the actuator pin 165 in a single line position 240 for providing a single line spray pattern 242. The single line of paint flows from chamber 140 through control hole 230 and through the fluid emitting hole 232. There is no flow of paint through emitting holes 234 and 236 as indicated by the control arrows 244.

In FIG. 17, the actuator pin 165 is moved into a double line position 245 for providing a double line spray pattern 246. There is no flow of fluid through hole 236, as shown by flow arrow 248.

In FIG. 18, the actuator pin 165 is shifted into a triple line position 250 to provide a triple line flow pattern 252. In forming the triple line spray pattern 252, the paint flows through each of the control holes 226, 228 and 230 and then through the respective fluid emitting holes 236, 234 and 232.

Figure 19:
FIG. 19 is a side elevational view of a butt end of a felled and bucked log showing a non-spray or no discharge condition where no paint has been sprayed.

FIGS. 19-31 illustrate various predetermined spray patterns which may be accomplished by selectively positioning the actuator pin 165 of the spray paint control valve plate 154'. FIG. 19 shows a no-mark pattern 254 of an unpainted log end, which may be accomplished by shifting pin 165 to the far left position within slot 185, as shown in FIG. 12 for the no flow position 190.

Figure 20:
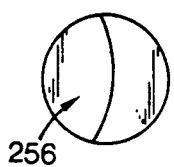
Figure 21:
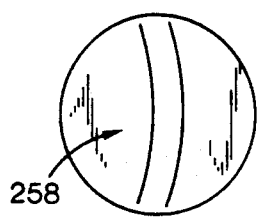
Figure 22:
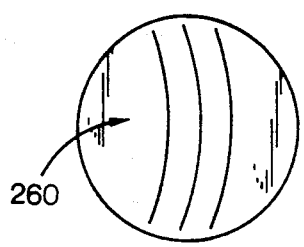

FIGS. 21-22 illustrate continuous stripe patterns provided by allowing paint to flow during the entire cutting stroke. FIG. 20 shows a single stripe continuous line pattern 256 made according to FIG. 16. FIG. 21 shows a double stripe continuous line pattern 258 made according to FIG. 17. FIG. 22 shows a triple stripe continuous line pattern 260 made according to FIG. 18.

Figure 23:
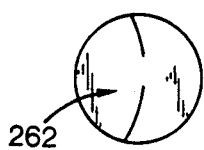
Figure 24:
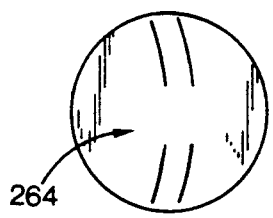
Figure 25:
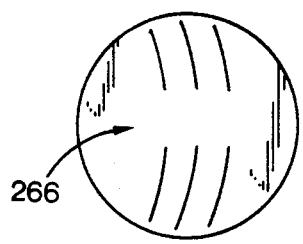

FIGS. 23-25 show broken stripe patterns formed by initiating fluid flow at the beginning of the cutting stroke, followed by shifting the actuator pin to the off position (see position 190 in FIG. 12) during an intermediate portion of the cutting stroke, and then again shifting the actuator pin to a fluid flow position during a final portion of the cutting stroke.

FIG. 23 shows a single line broken stripe pattern 262 made by shifting the actuator pin from the single line position 240 (FIG. 16) to the off position (see position 190 in FIG. 12) and back to the single line position 240. FIG. 24 shows a double line broken stripe pattern 264 made by shifting the actuator pin from the single line position 245 to the off position and back to the single line position 245. FIG. 25 shows a triple line broken stripe pattern 266 made by shifting the actuator pin from the single line position 250 to the off position 190 and back to the single line position 250.

Figure 26:
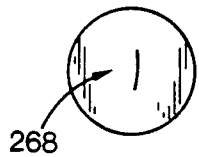
Figure 27:
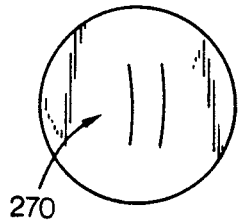
Figure 28:
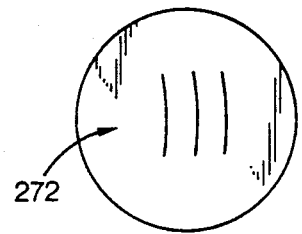

FIGS. 26–28 show three center strip patterns formed by prohibiting paint flow during the initial portion of the cutting stroke, then allowing paint to flow during the intermediate portion of the cutting stroke, and then stopping paint flow during the final portion of the cutting stroke.

FIG. 26 shows a single line center stripe pattern 268 accomplished by shifting the actuator pin 165 from an initial no flow position (see position 190 in FIG. 12), to a single line flow position 240, and then back to the no flow position. FIG. 27 shows a double line center stripe pattern 270 accomplished by shifting the actuator pin 165 from an initial no flow position, to a double line flow position 245, and then back to the no flow position. FIG. 28 shows a triple line center stripe pattern 272 formed by shifting the actuator pin 165 from the initial no flow position, to a triple line flow position 250, and then back to the no flow position.

Figure 29:
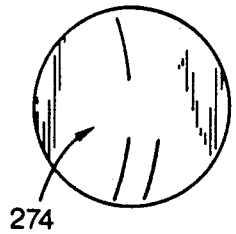
Figure 30:
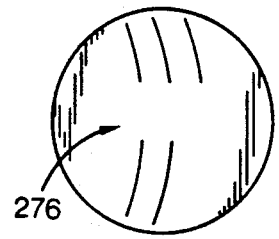
Figure 31:
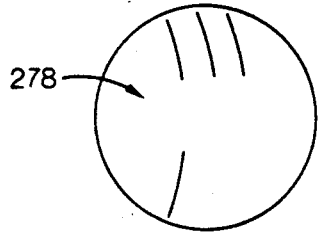

FIGS. 29–31 illustrate several manners of providing an alternating stripe pattern using a nonsymmetrical type of shifting pattern.

FIG. 29 shows an alternating single and double line combination stripe pattern 274. The pattern 274 is provided by shifting the actuator pin 165 during the initial part of the cutting stroke into the single line flow position 240. This is followed by shifting pin 165 to the no flow position (see position 190 in FIG. 12) during the intermediate portion of the stroke, and then shifting to the double line position 245 during the last part of the cutting stroke.

FIG. 30 shows an alternating triple and double line combination stripe pattern 276. The pattern 276 is provided by shifting the actuator pin 165 during the initial part of the cutting stroke into the triple line flow position 250. This is followed by shifting pin 165 to the no flow position (see position 190 in FIG. 12) during the intermediate portion of the stroke, and then shifting to the double line position 245 during the last portion of the cutting stroke.

FIG. 31 shows an alternating triple and single line combination stripe pattern 278. The pattern 278 is provided by shifting the actuator pin 165 during the initial part of the cutting stroke into the triple line flow position 250. This is followed by shifting pin 165 to the no flow position (see position 190 in FIG. 12) during the intermediate portion of the stroke, and then shifting to the single line position 240 during the last part of the cutting stroke.

FIGS. 32 and 33 illustrate an alternate harvester head 40″ which may be as described above for harvester 40′, except where differences are noted below. The harvester head 40″ has an alternate saw bar 300 attached thereto. The alternate saw bar 300 has similar components to the saw bar 100 of FIG. 4, and such similar components have the same numbering. The saw bar 300 differs from saw bar 100 of FIG. 4 by having a bar member 301 with two elongated chambers 302 and 304 symmetrically arranged around a longitudinal axis 306 of the saw bar.

The saw bar 300 has a lubrication or oil delivery passageway 310 extending along the longitudinal axis 306 from the attachment end 104 to the sprocket recess 118. The oil passageway 310 is forked at the attachment end into two oil delivery channels 312 and 314 which receive oil from reservoir 131 through inlet ports 316 and 318, respectively. Thus, regarding the lubrication aspects of saw bar 300, the symmetrical placement of the oil inlet ports 316 and 318 provides a reversible saw bar that may be flipped so either cutting edge 124 or 125 may serve as the leading cutting edge.

The fluid chambers 302 and 304 receive fluid through respective fluid inlet ports 320 and 322, each having a semi-circular tubular fluid inlet sleeve 323 and 324, respectively. The symmetrical placement of the fluid carrying chambers 302, 304 and inlet ports 320, 322 also facilitates the reversibility of saw bar 300. The saw bar 300 may be a laminate saw bar, similar to that described for saw bar 100, with an inner laminate plate 325 having recesses defined by fluid chambers 302 and 304 and the oil passageways 310, 312 and 314. Two outer laminate plates 326 and 328 each have two sets of fluid emitting holes, such as holes 330 and 332 of plate 328 to provide flow from chambers 302 and 304.

A variety of configurations are possible using either flow control 150 or 150′, or by using a flow control hole arrangement as shown in FIGS. 13–15 for spraying urea, or as shown in FIGS. 16–18 for spray marking with paint.

Referring to FIG. 32, the saw bar 300 is oriented with an outer surface 344 pointing downwardly, and an outer surface 336 pointing upwardly. The computer 80 supplies the flow control signal 81 to actuator 82. The actuator 82 has actuator rod 84 coupled to a first actuator pin 338 extending downwardly from a flow controller located within chamber 302. The computer 80 supplies a second flow control signal 340 to a second actuator 342. The actuator 342 has an actuator rod 343 coupled to a second actuator pin 344 extending upwardly from a flow control located within chamber 304. The actuator pins 338 and 344 corresponding in function to pin 165 described above so the flow controllers in chambers 302 and 304 each respond to the computer 80.

The chamber 302 may be coupled to a urea-filled reservoir 131. With cutting edge 124 as the leading edge, saw bar 300 would provide a downwardly directed spray pattern 346 of urea onto a stump such as stump 44 (see FIG. 1). With the harvester head 40″ equipped with a third fluid reservoir 348 to carry a marking paint, the flow controller within chamber 304 may be operated by actuator 342 in response to a paint marking signal 340 to provide an upwardly directed paint spray pattern 350, which is illustrated as a triple line pattern (see FIG. 18).

Alternatively, the actuator 342 could be located on the lower side of the saw bar 300 to provide both urea spray and paint marking from the surface 344. That is, both downwardly directed urea spray and downwardly directed paint marking could be accomplished. This may be particularly advantageous for the system shown in FIG. 2 where log surface 88 would be marked with paint, and the stump 44 from which log end 86 was severed would also be sprayed with urea.

As a further alternative, such a dual unidirectional spraying system may be used to provide greater marking flexibility. For example, the fluid reservoirs 131 and 348 may be filled with different colors of paint by providing different colors to each chamber 302 and 304. Other striping patterns may be made using other alignments and configurations of control and fluid emitting holes, as well as other shifting patterns for pins 338 and 344 to provide more complex markings than those shown in FIGS. 20-31.

Alternatively, only one of the fluid channels 302 or 304 may be used at a single time for providing either urea spray or paint marking. Preferably for the urea spray embodiment, the channel emitting fluid is located between the leading cutting edge and the longitudinal axis 306. Such an orientation advantageously allows a larger portion of the downwardly directed saw bar outer surface, such as surface 334 in FIG. 32, to spread the urea after it has been emitted. Also, by only using one of the fluid channels 302 or 304 at a single time, the saw bar 300 may be used by harvesters with either a left or a right hand sweep, that is, with either edge 124 or 125 serving as the cutting edge.

For a marking system, depending upon the type of paint used and the spacing between the paint emitting holes 232, 234 and 236, in some applications it may be advantageous to have the paint emitted between the leading edge and the axis 306. In other marking applications it may be advantageous to have the paint be emitted between the axis 306 and the trailing edge of saw bar 300. The type of paint used, as well as the type of tree being cut, may also have an influence on this selection.

The valve plate controller 150 is particularly adaptable to the reversible embodiments. The valve plate controlling flow from a saw bar surface from which no fluid is to flow may be locked into an off position (see 190 in FIG. 12) by a positive locating mechanism (not shown) within the harvester head 40 or the attachment means. In the valve plate flow controller 150, the actuators 82, 342 may be located on the side of the saw bar from which fluid is desired to be sprayed. With the tubular flow controller 150', advantageously the actuator 82, 342 may be mounted on either side of the saw bar regardless of the desired fluid spray direction.

Use of the tubular liner flow control 150' as described above in both channels 302 and 304 provides either a nonreversible unidirectional dual spraying bar, a single-channel spraying reversible saw bar, or a nonreversible dual directional spraying saw bar. However, it is apparent reversibility of the saw bar 300 may be provided by configuring the tubular liner flow controller 150' with multiple shifting increments in slot 185 (not shown), or with other fluid emitting hole and control hole sizing and spacing arrangements (not shown).

Therefore, a variety of methods are illustrated herein for marking logs and urea spraying logs of varying diameter. Methods are provided for sequentially and simultaneously accomplishing both urea-spraying and paint marking, whether the predetermined spray pattern is emitted in the same direction or in opposite directions from the saw bar.

Therefore, having illustrated and described the principles of our invention with respect to the preferred embodiments, it should be apparent to those skilled in the art that our invention may be modified in arrangement and detail without departing from such principles. For example, other means may be employed of manufacturing the saw bars 100 or 300, and other types of tree harvesters or hand-held chain saws may use the saw bars 100 and 300. Additionally, other arrangements may be employed for locating the various inlet and outlet holes for the fluid chambers and the flow controllers 150 and 150'. For example, elongated holes could be provided in the outer plates 142 and 144, and circular spaced apart holes could be provided along the control valve plates 152 or 154, or through the flow control walls 172 and 174. We claim all such modifications falling within the scope and spirit of the following claims.

We claim:

1. A fluid spraying saw bar, comprising:
    a bar member having an attachment end for attachment to a chain saw, a peripheral edge including guide means for guiding an endless cutting chain about a portion of the peripheral edge, two opposing outer surfaces, an elongate chamber for receiving a fluid, and plural fluid emitting holes extending from the chamber to at least one of the outer surfaces; and
    a flow controller shiftably received in the bar member chamber to selectively control fluid flow through the fluid emitting holes to provide a predetermined spray pattern of fluid from the saw bar.

2. A fluid spraying saw bar according to claim 1 wherein the flow controller has a flow control wall with plural control holes therethrough selectively alignable with at least one of the fluid emitting holes to allow fluid flow therethrough when a control hole is at least partially aligned with a fluid emitting hole.

3. A fluid spraying saw bar according to claim 2 wherein the fluid emitting holes are substantially evenly spaced-apart along the length of the elongate chamber.

4. A fluid spraying saw bar according to claim 3 wherein at least one of the control holes comprises an elongated control hole through the flow control wall.

5. A fluid spraying saw bar according to claim 4 wherein the control holes comprise at least one short control hole having a first length, at least one intermediate length control hole having a second length longer than the first length, and at least one long control hole having a third length longer than the second length.

6. A fluid spraying saw bar according to claim 5 wherein the control holes are arranged with the intermediate length control hole located between the short control hole and the long control hole.

7. A fluid spraying saw bar according to claim 5 wherein the control holes are arranged with at least one long control hole located between at least two intermediate length control holes, and at least two intermediate length control holes are located between at least two short control holes.

8. A fluid spraying saw bar according to claim 1 wherein the bar member has a longitudinal axis, and the fluid emitting holes are arranged substantially along the longitudinal axis.

9. A fluid spraying saw bar according to claim 1 wherein the flow controller comprises a tubular fluid chamber liner member captured within the elongate chamber, the liner member having a flow control wall with plural control holes therethrough selectively alignable with at least one of the fluid emitting holes to allow fluid flow therethrough when a control hole is at least partially aligned with a fluid emitting hole.

10. A fluid spraying saw bar according to claim 9 wherein the tubular fluid chamber liner member has a substantially hexagonal cross section.

11. A fluid spraying saw bar according to claim 9 wherein:

the tubular fluid chamber liner member has an alignment member; and the bar member has an alignment member receiving recess for receiving the alignment member.

12. A fluid spraying saw bar according to claim 1 wherein:

bar member has a longitudinal axis;

the elongated chamber comprises a first chamber;

the fluid emitting holes comprise a first set of fluid emitting holes;

the bar member further includes a second elongate chamber having a second set of plural fluid emitting holes extending from the second chamber to at least one of the outer surfaces;

the first and second chambers are located to each side of the longitudinal axis; and the flow controller comprises first and second flow controllers shiftably received in the respective first and second chambers.

13. A fluid spraying saw bar according to claim 12 wherein the first and second sets of fluid emitting holes extend to each of the outer surfaces, thereby providing a reversible fluid spraying saw bar.

14. A fluid spraying saw bar according to claim 12 wherein the bar member further includes:

a nose end opposite the attachment end; and the bar member has a lubrication fluid passageway extending substantially along the longitudinal axis from the attachment end to the nose end.

15. A fluid spraying saw bar according to claim 1 wherein the bar member comprises a laminated bar having a pair of outer laminate plates and an inner laminate plate sandwiched between the pair of outer plates and joined therewith, and the inner plate having an elongate slot cooperating with the pair of outer laminate plates to define the elongate chamber, with the fluid emitting holes extending through at least one of the pair of outer laminate plates.

16. A fluid spraying saw bar according to claim 15 wherein the flow controller comprises a valve plate having a flow control wall with plural control holes therethrough selectively alignable with at least one of the fluid emitting holes to allow fluid flow therethrough when a control hole is at least partially aligned with a fluid emitting hole.

17. A fluid spraying saw bar according to claim 15 wherein:

the bar member peripheral edge has first and second opposing cutting edges, with the fluid emitting holes extending through each of the pair of outer plates; and flow controller comprises a first and second valve plates each having a flow control wall with plural control holes therethrough, the with the first valve plate control holes selectively alignable with at least one of the fluid emitting holes through one of the outer plates and the second valve plate control holes selectively alignable with at least one of the fluid emitting holes through the other of the outer plates;

whereby the first valve plate is controllable to spray a predetermined spray pattern when the saw bar is mounted to the chain sawing apparatus with the first cutting edge serving as a leading cutting edge, and the second valve plate is controllable to spray a predetermined spray pattern when the saw bar is mounted to the chain sawing apparatus with the second cutting edge serving as a leading cutting edge.

18. A fluid spraying saw bar according to claim 15 wherein the flow controller comprises a tubular fluid chamber liner member captured within a portion of the elongate chamber, with the liner member having a flow control wall with plural control holes therethrough selectively alignable with at least one of the fluid emitting holes to allow fluid flow therethrough when a control hole is at least partially aligned with a fluid emitting hole.

19. A fluid spraying saw bar according to claim 1 wherein:

the fluid emitting holes extend from the chamber to each of the outer surfaces; and the chamber includes first and second branches, with the first branch terminating at a first chamber inlet port at one of the outer surfaces, and the second branch terminating at a second chamber inlet port at the other of the outer surfaces, thereby providing a reversible fluid spraying saw bar.

20. A fluid spraying saw bar for spraying a fluid when mounted on a chain sawing apparatus having a frame, attachment means for attaching the saw bar to the frame, an endless cutting chain mounted on the saw bar, drive means for driving the cutting chain, and a fluid reservoir, the saw bar comprising:

a bar member having an attachment end for attachment to the frame, a peripheral edge including guide means for guiding the endless cutting chain about at least a portion of the peripheral edge, two opposing outer surfaces, an elongate chamber for receiving a fluid from the fluid reservoir, and plural fluid emitting holes extending from the chamber to at least one of the outer surfaces; and a flow controller shiftable received in the bar member chamber to control fluid flow through the fluid emitting holes to provide a predetermined spray pattern of fluid from the saw bar when mounted on the chain sawing apparatus.

21. A fluid spraying saw bar according to claim 20 wherein:

the chain sawing apparatus has an actuator for operating a flow controller in the saw bar; and the flow controller is adapted to be operatively connected to the actuator for effecting shifting of the flow controller to control fluid flow.

22. A fluid spraying saw bar according to claim 20 wherein:

the bar member peripheral edge has first and second opposing cutting edges, with the fluid emitting holes arranged to extend from the chamber to each of the outer surfaces;

the reservoir has an outlet for delivering fluid from the reservoir to the saw bar;

the chamber includes first and second branches, with the first branch extending to the reservoir outlet when bar is assembled with the first cutting edge serving as a leading cutting edge, and the second branch extending to the reservoir outlet when bar is assembled with the second cutting edge serving as the leading cutting edge.

23. A fluid spraying saw bar according to claim 20 wherein:

bar member has a longitudinal axis; the elongated chamber comprises a first chamber;

the fluid emitting holes comprise a first set of fluid emitting holes;

the bar member further includes a second elongate chamber having a second set of plural fluid emitting holes extending from the second chamber to at least one of the outer surfaces;

the first and second chambers are located to each side of the longitudinal axis; and the flow controller comprises first and second flow controllers shiftably received in the respective first and second chambers.

24. A fluid spraying saw bar according to claim 23 wherein:

the bar member peripheral edge has first and second opposing cutting edges;

the reservoir has an outlet for delivering fluid from the reservoir to the saw bar;

the first set of fluid emitting holes extends from the first chamber to one of the outer surfaces;

the second set of fluid emitting holes extends from the second chamber to the other of the outer surfaces;

the first chamber receives fluid from the reservoir outlet when the saw bar is mounted to the chain sawing apparatus with the first cutting edge serving as the leading cutting edge; and the second chamber receives fluid from the reservoir outlet when the saw bar is mounted to the chain sawing apparatus with the second cutting edge serving as the leading cutting edge, thereby providing a reversible fluid spraying saw bar.

25. A fluid spraying saw bar according to claim 23 wherein:

the reservoir comprises a first reservoir for storing a first fluid for delivery to the first chamber;

the chain sawing apparatus further includes a second reservoir for storing a second fluid for delivery to the second chamber;

the first and second sets of fluid emitting holes extend to at least one of the outer surfaces; and the first chamber receives the first fluid from the first reservoir and the second chamber receives the second fluid from the second reservoir when the saw bar is mounted to the chain sawing apparatus.

26. A fluid spraying saw bar according to claim 23 wherein the first and second sets of fluid emitting holes extend to each of the outer surfaces, thereby providing a reversible fluid spraying saw bar.

27. A fluid spraying saw bar according to claim 23 wherein:

the chain sawing apparatus actuator comprises first and second actuators;

the first flow controller is adapted to be operatively connected to the first actuator for effecting shifting of the first flow controller to control fluid flow through the first set of fluid emitting holes; and the second flow controller is adapted to be operatively connected to the first actuator for effecting shifting of the first flow controller to control the fluid flow through the second set of fluid emitting holes.

28. A fluid spraying saw bar according to claim 23 wherein:

the reservoir comprises a first reservoir for storing a first fluid for delivery to the first chamber;

the chain sawing apparatus further includes a second reservoir for storing a second fluid for delivery to the second chamber;

the first set of fluid emitting holes extends from the first chamber to one of the outer surfaces;

the second set of fluid emitting holes extends from the second chamber to the other of the outer surfaces; and the first chamber receives the first fluid from the first reservoir and the second chamber receives the second fluid from the second reservoir when the saw bar is mounted to the chain sawing apparatus.

29. A fluid spraying saw bar according to claim 23 wherein:

the chain sawing apparatus includes a lubrication fluid reservoir for storing a lubrication fluid;

the bar member has a nose end opposite the attachment end;

the bar member includes an idler sprocket pivotally mounted at the nose end; and the bar member has a lubrication fluid delivery passageway located therein between the first and second chambers, with the lubrication fluid delivery passageway for receiving lubrication fluid from the lubrication fluid reservoir and for delivering the lubrication fluid therethrough to the sprocket.

30. A fluid spraying saw bar according to claim 20 wherein the flow controller comprises a tubular fluid chamber liner member captured within the elongate chamber, the liner member having a flow control wall with plural control holes therethrough selectively alignable with at least one of the fluid emitting holes to allow fluid flow therethrough when a control hole is at least partially aligned with a fluid emitting hole.

31. A fluid spraying saw bar according to claim 30 wherein the tubular fluid chamber liner member has a substantially hexagonal cross section.

32. A fluid spraying saw bar according to claim 30 wherein:

the tubular fluid chamber liner member has an alignment member; and the bar member has an alignment member receiving recess for receiving the alignment member.

33. A fluid spraying saw bar according to claim 20 wherein the bar member comprises a laminated bar having a pair of outer laminate plates and an inner laminate plate sandwiched between the pair of outer plates and joined therewith, and the inner plate having an elongate slot cooperating with the pair of outer laminate plates to define the elongate chamber, with the fluid emitting holes extending through at least one of the pair of outer laminate plates.

34. A fluid spraying saw bar according to claim 33 wherein the flow controller comprises a valve plate having a flow control wall with plural control holes therethrough selectively alignable with at least one of the fluid emitting holes to allow fluid flow therethrough when a control hole is at least partially aligned with a fluid emitting hole.

35. A fluid spraying saw bar according to claim 33 wherein:

the bar member peripheral edge has first and second opposing cutting edges, with the fluid emitting holes extending through each of the pair of outer plates; and flow controller comprises a first and second valve plates each having a flow control wall with plural control holes therethrough, the with the first valve plate control holes selectively alignable with at least one of the fluid emitting holes through one of the outer plates and the second valve plate control holes selectively alignable with at least one of the fluid emitting holes through the other of the outer plates;

whereby the first valve plate is controllable to spray a predetermined spray pattern when the saw bar is mounted to the chain sawing apparatus with the first cutting edge serving as a leading cutting edge, and the second valve plate is controllable to spray a predetermined spray pattern when the saw bar is mounted to the chain sawing apparatus with the second cutting edge serving as a leading cutting edge.

36. A fluid spraying saw bar according to claim 33 wherein the flow controller comprises a tubular fluid chamber liner member captured within a portion of the elongate chamber, with the liner member having a flow control wall with plural control holes therethrough selectively alignable with at least one of the fluid emitting holes to allow fluid flow therethrough when a control hole is at least partially aligned with a fluid emitting hole.

37. A fluid spraying chain sawing assembly, comprising:
   a frame having a reservoir for storing a fluid;
   a saw bar detachably mounted to the frame, the saw bar having a bar member with a peripheral edge including guide means for guiding an endless cutting chain about at least a portion of the peripheral edge, the bar member also having two opposing outer surfaces, an elongate chamber receiving the fluid from the fluid reservoir, and plural fluid emitting holes extending from the chamber to at least one of the outer surfaces;
   an endless cutting chain mounted on the saw bar;
   drive means for driving the cutting chain; and
   the saw bar also having a flow controller shiftably received in the bar member chamber for controlling fluid flow through the fluid emitting holes to provide a predetermined spray pattern of fluid from the saw bar.

38. A fluid spraying chain sawing assembly according to claim 37 wherein the chain sawing assembly further includes an actuator operatively connected to the flow controller for shifting the flow controller to control fluid flow.

39. A fluid spraying chain sawing assembly according to claim 38 further including:
   a determining device to determine preselected physical characteristics of a member to be cut by the assembly and to produce a physical characteristic signal in response thereto; and
   a controller for producing a flow control signal in response to the physical characteristic signal;
   wherein the actuator shifts the flow controller in response to the flow control signal.

40. A fluid spraying chain sawing assembly according to claim 38 further including:
   a log length determining device responsive to the length of a log cut by the assembly for producing a log length signal;
   a log diameter determining device responsive to the diameter of a log cut by the assembly for producing a log diameter signal; and
   a controller for producing a flow control signal in response to the log length signal and the log diameter signal;
   wherein the actuator shifts the flow controller in response to the flow control signal.

41. A fluid spraying chain sawing assembly according to claim 38 wherein:
   the fluid comprises urea;
   the assembly further includes a log diameter determining device responsive to the diameter of a log cut by the assembly for producing a log diameter signal, and a controller for producing a flow control signal in response to the log diameter signal; and
   the actuator shifts the flow controller in response to the flow control signal according to the log diameter.

42. A method of selectably spraying a predetermined fluid spray pattern on a surface being formed by cutting of a member, comprising the steps of:
   cutting a member with an endless cutting chain driven about and supported by a saw bar having two opposing side surfaces, the saw bar also having a fluid receiving chamber and plural fluid emitting holes extending from the chamber to at least one of the outer surfaces, and the saw bar also having a flow controller for controlling fluid flow from the chamber through selected ones of said holes to at least one of the side surfaces of the saw bar;
   supplying a fluid to the chamber of the saw bar; and
   operating the saw bar flow controller to provide the predetermined fluid spray pattern through said selected holes during the cutting step.

43. A method according to claim 42 wherein: the cutting step comprises cutting a log; the fluid is urea;
   the method further includes the step of determining the diameter of the log cut; and
   the operating step comprises operating the flow controller to vary the spray pattern of urea fluid according to the determined log diameter.

44. A method according to claim 42 wherein:
   the cutting step comprises cutting a log;
   the fluid is a marking fluid;
   the method further includes the step of determining preselected physical characteristics of the log cut; and
   the operating step comprises operating the flow controller to vary the spray pattern of marking fluid according to the determined physical characteristics.

45. A method according to claim 42 wherein:
   the cutting step comprises cutting with a saw bar having first and second fluid receiving chambers, with first and second sets of plural fluid emitting holes extending from the respective first and second chambers to at least one of the outer surfaces, and first and second flow controllers for controlling fluid flow from the respective first and second chambers; and
   the supplying step comprises supplying first and second fluids to the respective first and second chambers.

46. A method according to claim 45 further including the step of selectively spraying the first and second fluids from one of the saw bar side surfaces.

47. A method according to claim 45 further including the step of spraying the first fluid from one of the saw bar side surfaces and spraying the second fluid from the other of the saw bar side surfaces.

48. A method according to claim 42 wherein:
   the cutting step comprises cutting with a saw bar having a longitudinal axis with first and second fluid receiving chambers located to each side of the longitudinal axis, with first and second sets of plural fluid emitting holes extending from the respective first and second chambers to at least one of the outer surfaces, and a first flow controller for controlling fluid flow from the first chamber to one of the side surfaces of the saw bar, and a second flow controller for controlling fluid flow from the second chamber to the other of the side surfaces of the saw bar; and the supplying step comprises supplying fluid to one of the first and second chambers.

49. A method according to claim 42 wherein:

the cutting step comprises cutting with a leading edge of the saw bar; and the method further includes the step of spraying the fluid from the one of the first and second chambers located between the leading edge and the longitudinal axis.

50. A method according to claim 42 wherein:

the cutting step comprises felling a tree by severing the tree to form a felled tree portion and a tree stump using a saw bar having first and second fluid receiving chambers, with first and second sets of plural fluid emitting holes extending from the respective first and second chambers to at least one of the outer surfaces, and first and second flow controllers for controlling fluid flow from the respective first and second chambers;

the supplying step comprises supplying a urea fluid to the first chamber and a marking fluid to the second chamber;

the method further includes the steps of:

(a) bucking the felled tree portion into a log of a desired length having a log end, (b) determining the diameter and length of the log cut, (c) spraying the tree stump with the urea fluid from the first chamber, and (d) spraying the log end with the marking fluid from the second chamber; and the operating step comprises operating the first flow controller to vary the spray pattern of urea fluid according to the determined log diameter, and operating the second flow controller to vary the spray pattern of marking fluid according to the determined log diameter and length.

51. A method according to claim 42 wherein:

the cutting step comprises felling a tree by severing the tree to form a tree stump portion and log portion having a log end formed during the severing, the cutting step accomplished using a saw bar having first and second fluid receiving chambers, with first and second sets of plural fluid emitting holes extending from the respective first and second chambers to at least one of the outer surfaces, and first and second flow controllers for controlling fluid flow from the respective first and second chambers;

the supplying step comprises supplying a urea fluid to the first chamber and a marking fluid to the second chamber;

the method further includes the steps of determining preselected physical characteristics of the cut log portion, and spraying the tree stump with the urea fluid from the first chamber while spraying the log end with the marking fluid from the second chamber; and the operating step comprises operating the first flow controller to vary the spray pattern of urea fluid according to the determined log diameter, and operating the second flow controller to vary the spray pattern of marking fluid according to the physical characteristics of the log.

* * * * *

UNITED STATES PATENT AND TRADEMARK OFFICE
CERTIFICATE OF CORRECTION

PATENT NO.  : 5,143,131
DATED       : September 1, 1992
INVENTOR(S) : Seigneur, et al.

It is certified that error appears in the above-indentified patent and that said Letters Patent is hereby corrected as shown below:

Column 3, line 25, "thereof," should be --thereof;--;

Column 3, line 44, "pattern; FIG. 17" should be --pattern, FIG. 17--;

Column 3, line 51, "using/" should be --using--;

Column 5, line 41, "may used" should be --may be used--;

Column 5, line 59, "m®mber" should be --member--;

Column 5, line 67, "edg®" should be --edge--;

Column 8, line 7, "!78" should be --178--;

Column 9, line 13, "Referring to FIGS. 12-15, illustrate" should be --FIGS. 12-15 illustrate--;

Column 9, line 64, "!68" should be --168--;

UNITED STATES PATENT AND TRADEMARK OFFICE
CERTIFICATE OF CORRECTION

PATENT NO. : 5,143,131
DATED : September 1, 1992
INVENTOR(S) : Seigneur, et al.

It is certified that error appears in the above-indentified patent and that said Letters Patent is hereby corrected as shown below:

Column 11, line 12, "strip" should be --stripe--;

Column 15, claim 17, line 55, "therethrough, the with" should be --therethrough, with--;

Column 18, claim 35, line 64, "therethrough, the with" should be --therethrough, with--;

Column 20, claim 43, line 29, after "wherein:" a new paragraph should begin with the word --the--; and Column 20, claim 43, line 30, after "log" a new paragraph should begin with the word --the--.

Signed and Sealed this

Fourteenth Day of December, 1993

Attest:

BRUCE LEHMAN

*Attesting Officer*      *Commissioner of Patents and Trademarks*